United States Patent [19]

Miyoshi et al.

[11] Patent Number: 4,745,001
[45] Date of Patent: May 17, 1988

[54] PROCESS FOR THE PREPARATION OF MAGNETIC RECORDING MEDIUM

[75] Inventors: Takahito Miyoshi; Masaaki Fujiyama, both of Odawara, Japan

[73] Assignee: Fuji Photo Film Co., Ltd., Kanagawa, Japan

[21] Appl. No.: 7,166

[22] Filed: Jan. 27, 1987

[30] Foreign Application Priority Data

Jan. 24, 1986 [JP] Japan ................................. 61-13182

[51] Int. Cl.$^4$ ............................................. H01F 10/02
[52] U.S. Cl. ...................................... 427/48; 427/128; 427/130
[58] Field of Search .......................... 426/48, 128, 130

[56] References Cited

U.S. PATENT DOCUMENTS 3,630,910 12/1971 Akashi et al. ..................... 252/62.54
4,652,461 3/1987 Kato et al. ............................ 427/48

Primary Examiner—Bernard D. Pianalto
Attorney, Agent, or Firm—Sughrue, Mion, Zinn, Macpeak, and Seas

[57] ABSTRACT

Improvement in a process for the preparation of a magnetic recording medium which comprises the steps of applying a magnetic paint onto a surface of a nonmagnetic support to form a coated paint layer, said magnetic paint comprising magnetic recording layer-forming components including a ferromagnetic powder, an abrasive and a resin component dispersed in an organic solvent, and then subjecting the coated layer to magnetic orientation, in which a step of drawing the ferromagnetic powder in the coated magnetic paint toward the surface of the support by means of a magnet is arranged in advance of the orientation step.

5 Claims, 1 Drawing Sheet

PROCESS FOR THE PREPARATION OF MAGNETIC RECORDING MEDIUM

BACKGROUND OF THE INVENTION

1. Field of the Invention

The present invention relates to a novel process for preparing a magnetic recording medium comprising a nonmagnetic support and a magnetic recording layer.

2. Description of Prior Arts

A magnetic recording medium (also referred to hereinafter as "magnetic tape") comprising a nonmagnetic support and a magnetic recording layer provided thereon is used as an audio tape, a video tape or a recording medium for computer systems. The magnetic recording layer comprises a ferromagnetic powder such as a powder of $\gamma$-$Fe_2O_3$, Co-containing $\gamma$-$Fe_2O_3$ or a ferromagnetic metal powder, and an abrasive, both dispersed in a resin component (i.e., binder).

As for such magnetic recording medium, components for forming the magnetic recording layer are liable to drop off from the magnetic recording layer to adhere to a magnetic head, and other parts in the running procedure of the medium, so that an abrasive is incorporated into the magnetic recording layer to remove thus adhered components by the abrading action of the abrasive in the running procedure. Accordingly, it is apparent that only a portion of the abrasive protruded from the surface of the magnetic recording layer actually serves as abrasive, but other portion of the abrasive embedded in the magnetic recording layer does not actually function as an abrasive.

Recently, a demand for an enhanced density recording system has increased, and hence the amount of ferromagnetic powder contained in the magnetic recording layer ought to be increased. If the amount of the ferromagnetic powder is increased, the amount of the resin component in the recording layer is necessarily decreased. However, since the decrease of the amount of resin component tends to unfavorably lower mechanical strength of the magnetic recording layer, the increase of the amount of the ferromagnetic powder incorporatable into the recording layer is restricted to a certain level, so long as the measure of relying on decreasing the amount of resin component is adopted. For this reason, a measure of decreasing the amount of the abrasive in the recording layer is widely employed.

However, if the amount of the abrasive is decreased, the abrading action of the abrasive against a magnetic head, etc. is lowered in the running procedure of the resulting magnetic recording medium to cause poor running endurance of the medium. Thus, with respect to the relationship between the amount of ferromagnetic powder and the amount of abrasive, the improvement of electromagnetic conversion characteristics and the improvement of running endurance are incompatible in the conventional magnetic recording layer.

SUMMARY OF THE INVENTION

It is an object of the present invention to provide a novel process for the preparation of a magnetic recording medium improved in both of the electromagnetic conversion characteristics and the running endurance.

There is provided by the present invention a process for the preparation of a magnetic recording medium which comprises the steps of applying a magnetic paint onto a surface of a nonmagnetic support to form a coated paint layer, said magnetic paint comprising magnetic recording layer-forming components including a ferromagnetic powder, an abrasive and a resin component dispersed in an organic solvent, and then subjecting the coated layer to magnetic orientation, the improvement wherein a step of drawing said ferromagnetic powder in the coated magnetic paint toward the surface of the support by means of a magnet is arranged prior to subjecting the coated layer to magnetic orientation.

The magnetic recording medium prepared according to the present invention shows high running endurance as well as excellent electromagnetic conversion characteristics. In more detail, the magnetic recording medium prepared by the process of the invention shows higher electromagnetic conversion characteristics as compared with the same kind of the conventional magnetic recording medium having the running endurance equal to that of the medium according to the invention, and shows higher running endurance than the same kind of the conventional magnetic recording medium having the electromagnetic conversion characteristics equal to that of the medium of the present invention. Further, the present invention is favorably employable for preparing a magnetic recording medium much highly improved in both of the electromagnetic conversion characteristics and the running endurance as compared with the same kind of the conventional magnetic recording medium by well balancing both properties.

In addition, the process of the present is advantageously employed to obtain a magnetic recording medium being excellent both in the running endurance and the electromagnetic conversion characteristics by installing a magnet in a conventional device without using a complicated device such as a multi-layer coating device.

DETAILED DESCRIPTION OF THE INVENTION

Figure 1:
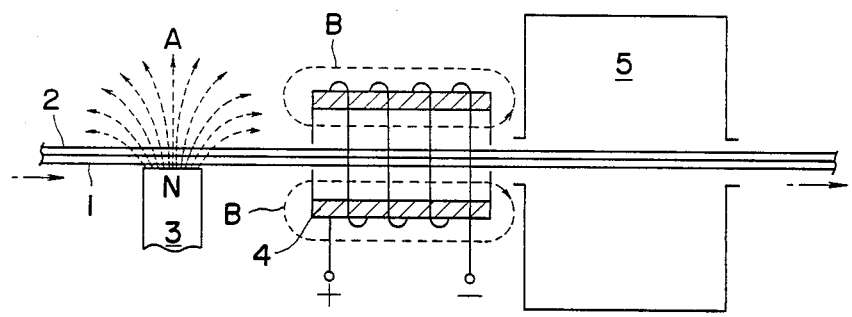
FIG. 1 is a schematic view showing an example of each of an orientation device for downward migration of ferromagnetic powder, a magnetic orientation device (conventional orientation device) and a drying device, in the installation for continuously preparing magnetic recording media.

For performing the process for the preparation of a magnetic recording medium of the invention, a magnetic paint comprising magnetic recording layer-forming components which contains a ferromagnetic powder, an abrasive and a resin component dispersed in an organic solvent is first prepared.

As a ferromagnetic powder employable in the invention, there can be selected from those conventionally employed. Examples of the ferromagnetic powder include an iron oxide-type ferromagnetic powder such as $\gamma$-iron oxide, a modified iron oxide ferromagnetic powder such as a ferromagnetic powder containing iron oxide and other metal (e.g., cobalt), and a ferromagnetic metal powder.

The ferromagnetic metal powder employable in the invention is one containing iron, cobalt or nickel, and having a specific surface area (S-BET) of not less than 42 $m^2g$, preferably not less than 45 $m^2g$. When the specific surface area of the ferromagnetic metal powder is less than 42 $m^2g$, a magnetic recording medium having high electromagnetic conversion characteristics can be hardly obtained.

As a typical ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, Fe-Zn-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. Processes for the preparation of those ferromagnetic metal powders are already known, and the ferromagnetic metal powder employed in the invention can be prepared by the known processes.

The modified iron oxide ferromagnetic powder preferably employed in the invention is Co-containing $\gamma$-$Fe_2O_3$ having a specific surface area of not less than 35 $m^2g$.

There is no specific limitation with respect to shape of the ferromagnetic powder employable in the invention, but generally used is a ferromagnetic powder in a needle shape, a grain shape, a dice shape, a rice shape or a plate shape.

The resin component can be also selected from those conventionally employed. Examples of the resin component include vinyl chloride copolymers (e.g., a copolymer of vinyl chloride and vinyl acetate with a monomer such as maleic anhydride or acrylic acid, a vinylidene chloride/vinyl chloride copolymer, a vinyl chloride/acrylonitrile copolymer, and a vinyl chloride copolymer having a polar group such as sulfonic acid group), an ethylene/vinyl acetate copolymer, cellulose derivatives such as nitrocellulose, an acrylic resin, a polyvinyl acetal resin, a polyvinyl butyral resin, an epoxy resin, a phenoxy resin, and polyurethane resins (e.g., a conventional polyurethane resin, polyester polyurethane resin, polyurethane resin having a polar group such as sulfonic acid group and polycarbonate polyurethane resin). The resin component can be employed singly, but generally employed is a combination of two or more resins such as a combination of vinyl chloride copolymer and polyurethane resin or a combination of a cellulose derivative and polyurethane resin.

It is preferred to employ a curing agent such as a polyisocyanate compound in combination with the abovementioned resin. Employment of the curing agent can provide a magnetic recording layer of high strength. The curing agent is generally employed in an amount of not larger than 20 parts by weight based on 100 parts by weight of the ferromagnetic powder.

The abrasive to be contained in the magnetic paint can be also selected from those conventionally employed. As the abrasive, an inorganic powder having a Mohs' scale of hardness of not less than 5 is generally employed.

Examples of the abrasive include $SiO_2$, $SnO_2$, $TiO_2$, $TiO$, $\alpha$-$Al_2O_3$, $Cr_2O_3$ and $\alpha$-$Fe_2O_3$. The abrasive can be employed singly, and a combination of two or more different kinds of abrasives can also be employed.

The abrasive is contained in the magnetic paint in an amount of generally 0.1 to 15 parts by weight, preferably 0.5 to 10 parts by weight, based on 100 parts by weight of the ferromagnetic powder.

The average particle diameter of the abrasive is generally in the range of 0.1 to 1 $\mu m$.

The magnetic paint may contain other known additives such as a lubricant, an antistatic agent, a filler and a dispersing agent in addition to the above-mentioned components.

As the solvent employable in kneading the above-described components, there can be mentioned those generally used in the preperation of a magnetic paint such as methyl ethyl ketone, methyl isobutyl ketone, cyclohexanone and toluene.

Kneading and dispersing those components can be carried out according to the conventional manner, and the order of addition of those components can be appropriately determined.

The magnetic paint prepared as above has a viscosity ranging from 60 to 200 ps.

Subsequently, the magnetic paint is coated over a nonmagnetic support.

As a material of the nonmagnetic support, there can be mentioned those conventionally employed. Examples of the nonmagnetic support material include synthetic resin films such as films of polyethylene terephthalate, polyethylene, ethylene, polypropylene, polycarbonate, polyethylene naphthalate, polyamide, polyamideimide, polyimide, polysulfone, and polyether sulfone; and metallic foils such as aluminum foil and stainless steel foil. The thickness of the nonmagnetic support is generally in the range of 3 to 50 $\mu m$, preferably in the range of 5 to 30 $\mu m$.

The nonmagnetic support may have a back layer (i.e., backing layer) on the opposite side of the side where a layer of the magnetic paint is to be coated. Further, the nonmagnetic support may be provided with an adhesive layer on the side where a layer of the magnetic paint is to be coated.

The magnetic paint is coated over the support in such a manner that the thickness of the resulting magnetic recording layer (after dryness) would be in the range of 0.2 to 10 $\mu m$, preferably in the range of 0.5 to 7.0 $\mu m$.

The coating of the magnetic paint over the support can be generally done by running the nonmagnetic support at a rate of 1 to 300 m/min.

The coated layer of the magnetic paint is then subjected to magnetic orientation (hereinafter also referred to as "conventional orientation") in the conventional process. However, in the process of the present invention, the coated layer is subjected to treatment of drawing the ferromagnetic powder contained in the layer to the nonmagnetic support-side of the layer (hereinafter also referred to as "downward migration orientation") by means of a magnet arranged, preferably, in close contact with the nonmagnetic support side (hereinafter referred to as "a back surface of the nonmagnetic support"), prior to the conventional orientation.

The downward migration orientation is conducted after the coating procedure of a magnetic paint and before the conventional orientation. In other words, the downward migration orientation is carried out while the ferromagnetic powder homogeneously dispersed in the coated layer has such a level of viscosity that the particles of the ferromagnetic powder are able to change their locations or directions in the coated layer owing to the magnetic field.

In the conventional process for the preperation of a magnetic recording medium, the conventional orientation is generally carried out within 60 sec. after coating the magnetic paint over the nonmagnetic support. Accordingly, in the present invention, the downward migration orientation is performed within 60 sec. after coating the magnetic paint over the nonmagnetic support.

FIG. 1 is a schematic view illustrating a preferred example of each of a downward migration orientation device, a conventional orientation device and a drying device in devices for continuously preparing a magnetic recording medium.

In FIG. 1, a nonmagnetic support 1 and a coated magnetic paint layer 2 (also referred to simply as "a coated layer") on the support 1 together run in the direction indicated by the straight arrow, keeping the back surface of the nonmagnetic support 1 in contact with a magnet 3 (hereinafter also referred to as "magnet for downward migration orientation").

The magnet for downward migration orientation is arranged in such a manner that any one of north and south poles of the magnet is brought into contact with the back surface of the nonmagnetic support 1. For instance, when north pole is kept in contact with the back surface of the nonmagnetic support, the magnetic flux is formed essentially vertically against the running direction of the coated layer 2 (namely, substantially parallel to the depthwise direction of the coated layer), as shown by broken lines A. When the coated layer 2 passes through such magnetic flux, the ferromagnetic powder, for example, in needle shape contained in the coated layer 2 is orientated along the direction of the magnetic flux, and at the same time drawn toward the side of the nonmagnetic support 1, so as to migrate in the coated layer toward the support resulting in gathering in the vicinity of the support. Therefore, the content ratio of the ferromagnetic powder in the coated layer 2 becomes higher as the depth of the coated layer 2 from its surface increases. At the same time when the ferromagnetic powder migrates downward, the abrasive present in the vicinity of the nonmagnetic support is pushed up toward the surface of the coated layer 2, whereby the content ratio of the abrasive increases in the vicinity of the surface of the coated layer and a great number of the abrasive particles function effectively.

Hence, the running endurance of the resulting magnetic recording medium can be improved, using a relatively small amount of abrasive. Further, since the ferromagnetic powder can be increased in an amount corresponding to the decreased amount of the abrasive, the resulting medium can be improved in the electromagnetic conversion characteristics. Furthermore, appropriate adjustment of the amounts of both the ferromagnetic powder and the abrasive can provide a magnetic recording medium improved in both of the electromagnetic conversion characteristics and the running endurance.

In addition to the above-mentioned advantages, orientation property of the ferromagnetic powder can be improved in the conventional orientation process by performing the downward migration orientation in advance, although the reason has not been clear.

In the invention, the magnetic flux is essentially vertical against the running direction of the magnetic paint-coated layer, or essentially parallel to the depth-wise direction of the coated layer, and this means that the magnetic flux of the central part of the magnet for the downward migration orientation has a nearly right angle to the running direction of the coated layer, or is almost parallel to the depthwise direction of the coated layer.

As the magnet employable for the downward migration orientation, there can be mentioned those capable of drawing the ferromagnetic powder in a magnetic field at a magnetic flux density of generally not less than 1,500 gauss, preferably not less than 2,000 gauss, more preferably not less than 2,500 gauss. When the magnetic flux density is less than 1,500 gauss, the downward migration orientation is hardly carried out effectively.

The period of time for the downward migration orientation can be appropriately determined in consideration of the strength of magnetic field, and the period is generally in the range of 0.5 to 60 sec., preferably 0.5 to 10 sec. When the period therefor is shorter than 0.5 sec., migration of the ferromagnetic powder is done not satisfactorily. When the period therefor is longer than 60 sec., the amount of the ferromagnetic powder excessively lowers in the vicinity of the surface of the magnetic paint-coated layer, and as a result, the electromagnetic conversion characteristics of the resulting medium are liable to decrease.

As a method for the downward migration orientation, a method of bringing the nonmagnetic support into contact with the north or south pole of the magnet for the downward migration orientation is most efficient and therefore preferred, as described hereinbefore. However, other methods can be also utilized, because the purpose of the present invention can be accomplished by making the magnetic flux reach the coated layer through the nonmagnetic support. For instance, the magnet may be placed near the back surface of the nonmagnetic support without being brought into contact with the nonmagnetic support. In this case, the space between the magnet and the nonmagnetic support is generally not longer than 5 mm.

Alternatively, plural magnets in the form of sticks for the downward migration orientation may be arranged in parallel to the back surface of the nonmagnetic support in such a manner that their parallel magnetic fluxes run in the running direction of the coated layer to perform the downward migration orientation.

Arrangement of the magnet only on the back surface of the nonmagnetic support is described above, but other arrangements can be also employed in the invention. For instance, two magnets are placed in such a manner that a certain length of space is given between the same poles of those magnets and that the magnetic paint-coated layer passes through the space. In this case, it is required that the ferromagnetic powder in the coated layer is drawn toward the nonmagnetic support side in the magnetic field under the condition of a magnetic flux density of not less than 1,500 gauss, preferably not less than 2,000 gauss, more preferably not less than 2,500 gauss.

After the downward migration orientation is complete, the coated magnetic paint layer is subjected to a conventional magnetic orientation (conventional orientation). The conventional orientation can be done under the conventional conditions. The conventional orientation is generally done using a magnetic orientation device comprising a solenoid, etc. capable of giving a magnetic flux density in the range of 500 to 3,500 gauss. In FIG. 1, the magnetic orientation device comprising a solenoid is shown by numeral 4. In the conventional orientation, the direction of the magnetic flux is parallel with the running direction of the nonmagnetic support, as indicated by broken lines B. Accordingly, the ferromagnetic powder contained in the coated layer is oriented along the direction of the magnetic flux.

In other words, the orientation direction of the ferromagnetic powder is the same as the running direction of the nonmagnetic support, and the conventional orientation does not serve to move the ferromagnetic powder in the depthwise direction of the coated layer.

The coated magnetic paint layer having been subjected to the conventional orientation as described above is then introduced into a drying device 5. In the drying device 5, the coated layer is dried to remove the organic solvent from the coated layer.

After the drying procedure is done, the sheet comprising the above-described nonmagnetic support and magnetic recording layer is subjected to conventional processings such as a surface smoothening process and a curing process, and then slitted to produce a magnetic recording medium having a desired shape.

The examples and the comparison examples of the present invention are given below. In the following examples, the expression "part(s)" means "part(s) by weight", unless otherwise specified.

EXAMPLE 1

The components for a magnetic paint indicated below were kneaded in a ball mill for 48 hours to give a homogeneous dispersion.

| | |
|---|---|
| Co-containing $\gamma$-Fe$_2$O$_3$ (specific surface area: 50 m$^2$/g) | 100 parts |
| Nitrocellulose (available from Daicel Chemcial Industry Co., Ltd. nitration degree: 11.5–12.2) | 10 parts |
| Polyurethane resin (N-2301, available from Nippon Polyurethane Co., Ltd.) | 2 parts |
| Polyisocyanate compound (Colonate L, available from Nippon Polyurethane Co., Ltd.) | 10 parts |
| Cr$_2$O$_3$ (abrasive, mean particle diameter: 0.5 $\mu$m) | 2 parts |
| Oleic acid | 1 part |
| Butyl stearate | 1 part |
| Methyl ethyl ketone | 300 parts |

The dispersion was filtered over a filter having a mean pore size of 1 $\mu$m to give a magnetic paint.

The magnetic paint was coated over a polyethylene terephthalate support by means of a reverse roll by running the support at a rate of 50 m/min., to give a coated layer of the magnetic paint having thickness of 3.5 $\mu$m (thickness in dry state).

The nonmagnetic support having the coated layer of the magnetic paint was further run at the same speed as described above, keeping the back surface of the support (surface where the coated layer was not provided) in contact with a magnet having a magnetic flux density of 2,500 gauss, to give a downward migration orientation for drawing the Co-containing $\gamma$-Fe$_2$O$_3$ contained in the coated layer to the nonmagnetic support side. The nonmagnetic support was brought into contact with the magnet for 5 sec. after the coating of the magnetic paint over the support was complete, and the nonmagnetic support was kept in contact with the magnet for 0.7 sec.

The laminated sheet having been subjected to the above-mentioned downward migration orientation was run to pass through a magnetic orientation device comprising solenoid (3,000 gauss) to give a magnetic orientation (conventional orientation), and then subjected to a drying procedure. After the drying procedure, the sheet was successively subjected to supercalendering and heat curing treatment, and then slit into a video tape (VHS-type) having width of ½ inch.

The obtained video tape was examined with respect to reproduction output, tendency of clogging on a head, and still life.

A signal of 5 MHz was input into the video tape using a commercially available VHS-type video tape recorder, and then the signal was reproduced from the video tape. The video tape was measured on a relative video output with reference to a reference tape (video tape prepared in Comparison Example 1) in which a video output of the reference tape recorded with a signal of the same 5 MHz was set to 0 dB.

Tendency of clogging on a head was examined by running the tape at a normal speed in the above-mentioned video tape recorder. The examination was made to determine running times at the end of which the clogging on the head was observed. In Table 1, the determined running times was referred to as "running times with no clogging".

Still life of the video tape was examined by continuously reproducing the video image from the tape in the above-mentioned video tape recorder under a still mode. The examination was made to determine a term (i.e., still life) at the end of which the reproduced video image under still mode turns to ⅔ of the recorded image.

The results are set forth in Table 1.

In Comparison Example 1 described below, the reproduction output, tendency of clogging on a head, and still life were examined according to the above-mentioned tests.

COMPARISON EXAMPLE 1

The procedure of Example 1 was repeated except for not performing the downward migration orientation to prepare a VHS-type video tape.

The obtained video tape was examined on the reproduction output, tendency of clogging on a head, and still life. The results are set forth in Table 1.

EXAMPLE 2

The procedure of Example 1 was repeated except for using the components for a magnetic paint indicated below and slitting the resulting sheet into a width of 8 mm, to give an 8 mm-type video tape.

| | |
|---|---|
| Ferromagnetic metal alloy powder (Fe—Ni alloy, Fe: 98 wt. %, Ni: 2 wt. %, specific surface area: 50 m$^2$/g) | 100 parts |
| Vinyl chloride/vinyl acetate/maleic anhydride copolymer (400 × 110A, available from Nippon Geon Co., Ltd.) | 11 parts |
| Polyurethane resin (the same as used in Example 1) | 2 parts |
| Polyisocyanate compound (the same as used in Example 1) | 10 parts |
| $\alpha$-Fe$_2$O$_3$ (abrasive, mean particle size: 0.2 $\mu$m) | 10 parts |
| Carbon black (mean particle size: 40 m$\mu$, available from Asahi Carbon Co., Ltd.) | 2 parts |
| Oleic acid | 1 part |
| Butyl stearate | 1 part |
| Methyl ethyl ketone | 300 parts |

The obtained video tape was examined with respect to reproduction output, tendency of clogging on a head, and still life.

A signal of 5 MHz was input into the video tape using an 8 mm-type video tape recorder (FUJIX-8), and then the signal was reproduced from the video tape. The video tape was measured on a relative video output with reference to a reference tape (video tape prepared in Comparison Example 2) in which a video output of the reference tape recorded with a signal of the same 5 MHz was set to 0 dB.

Still life of the video tape was examined by continuously reproducing the video image from the tape in the above-mentioned video tape recorder under a still mode. The examination was made to determine a term (i.e., still life) at the end of which the reproduced video image under still mode turns to ⅔ of the recorded image.

Tendency of clogging on a head was examined by running the tape at a normal speed in the above-mentioned video tape recorder. The examination was made to determine running times at the end of which the clogging on the head was observed.

The results are set forth in Table 1.

In Comparison Example 2 described below, the reproduction output, tendency of clogging on a head, and still life were examined according to the above-mentioned tests.

COMPARISON EXAMPLE 2

The procedure of Example 2 was repeated except for not performing the downward migration orientation to prepare an 8 mm-type video tape.

The obtained video tape was examined on the reproduction output, tendency of clogging on a head, and still life. The results are set forth in Table 1.

TABLE 1

|  | Reproduction Output (dB) | Running times with no clogging | Still Life |
| --- | --- | --- | --- |
| Example 1 | +3 | not less than 100 times | not shorter than 120 min. |
| Com. Example 1 | 0 | not less than 100 times | 40 min. |
| Example 2 | +2 | not less than 100 times | not shorter than 120 min. |
| Com. Example 2 | 0 | 10 times | 40 min. |

In Table 1, the still life of "not shorter than 120 min." means that ⅔ of the recorded video image remained even after the 120 min. running of the tape under still mode, and the running times with no clogging of "not less than 100 times" means that no clogging on the head took place even after the running of the tape was repeated 100 times.

We claim:

1. In a process for the preparation of a magnetic recording tape which comprises the steps of applying a magnetic paint onto a surface of a running nonmagnetic support to form a coated paint layer, said magnetic paint comprising magnetic recording layer-forming components including a ferromagnetic powder, an abrasive and a resin component dispersed in an organic solvent, and then subjecting the coated layer on a running non-magnetic support to magnetic orientation for orienting the magnetic powder in the coated paint layer along the running direction, the improvement wherein a step of drawing said ferromagnetic powder in the coated magnetic paint layer toward the surface of the support by means of a magnet having a magnetic flux density of not less than 1,500 gauss is performed prior to subjecting the coated paint layer to the magnetic orientation along the running direction.

2. The process as claimed in claim 1, wherein said ferromagnetic powder contained in the coated paint layer is drawn by means of a magnet which is placed in the vicinity of the nonmagnetic support on the back side free from the coated paint layer in the course of running the paint-coated support, keeping the back surface of the support essentially in contact with north or south pole of said magnet.

3. The process as claimed in claim 1 or 2, wherein said ferromagnetic powder is drawn in a magnetic field having a magnetic flux density of not less than 2,000 gauss.

4. The process as claimed in claim 1, wherein said abrasive is contained in the magnetic paint in an amount of not more than 15 parts by weight based on 100 parts by weight of the ferromagnetic powder.

5. The process as claimed in claim 1, wherein said abrasive is an inorganic powder made of at least one material selected from the group consisting of $SiO_2$, TiO, $TiO_2$, $\alpha$-$Al_2O_3$, $SnO_2$, $Cr_2O_3$ and $\alpha$-$Fe_2O_3$.

* * * * *